United States Patent [19]
Whorff

[11] Patent Number: 5,501,099
[45] Date of Patent: Mar. 26, 1996

[54] VAPOR DENSITY MEASUREMENT SYSTEM

[75] Inventor: Fredrick M. Whorff, Bakersfield, Calif.

[73] Assignee: ITT Corporation, New York, N.Y.

[21] Appl. No.: 258,650

[22] Filed: Jun. 13, 1994

[51] Int. Cl.[6] .................................................... G01F 1/74
[52] U.S. Cl. .................. 73/29.01; 73/30.02; 73/30.03; 73/861.04
[58] Field of Search ................ 73/30.01, 30.02, 73/30.03, 30.04, 31.04, 29.01, 29.03, 861.04

[56] References Cited

U.S. PATENT DOCUMENTS

| Re. 33,909 | 5/1992 | Brenner et al. | 73/29.03 |
|---|---|---|---|
| 2,439,723 | 4/1948 | Engdahl | 73/861.04 |
| 4,662,219 | 5/1987 | Nguyen | 73/861.04 X |
| 4,681,466 | 7/1987 | Chien et al. | 73/861.04 X |
| 5,031,466 | 7/1991 | Redus | 73/861.04 |
| 5,035,146 | 7/1991 | Chien et al. | 73/861.04 |
| 5,190,103 | 3/1993 | Griston et al. | 73/861.04 X |
| 5,302,325 | 4/1994 | Cheng | 261/76 |

Primary Examiner—Hezron E. Williams
Assistant Examiner—Michael J. Brock
Attorney, Agent, or Firm—Menotti J. Lombardi

[57] ABSTRACT

The relative amount of liquid and vapor flowing in a pipe is measured by mixing the vapor and liquid into a gaseous like single phase mixture and passing the mixture through a venturi constriction to accelerate it. The pressure drop across the venturi is measured as an indication of the velocity change which varies with the density of the mixture. Mixtures with more liquid generate more pressure drop. The average velocity of the pipe contents is also monitored to eliminate pressure drop changes that result from average velocity changes rather than density changes.

17 Claims, 1 Drawing Sheet

U.S. Patent
Mar. 26, 1996
5,501,099
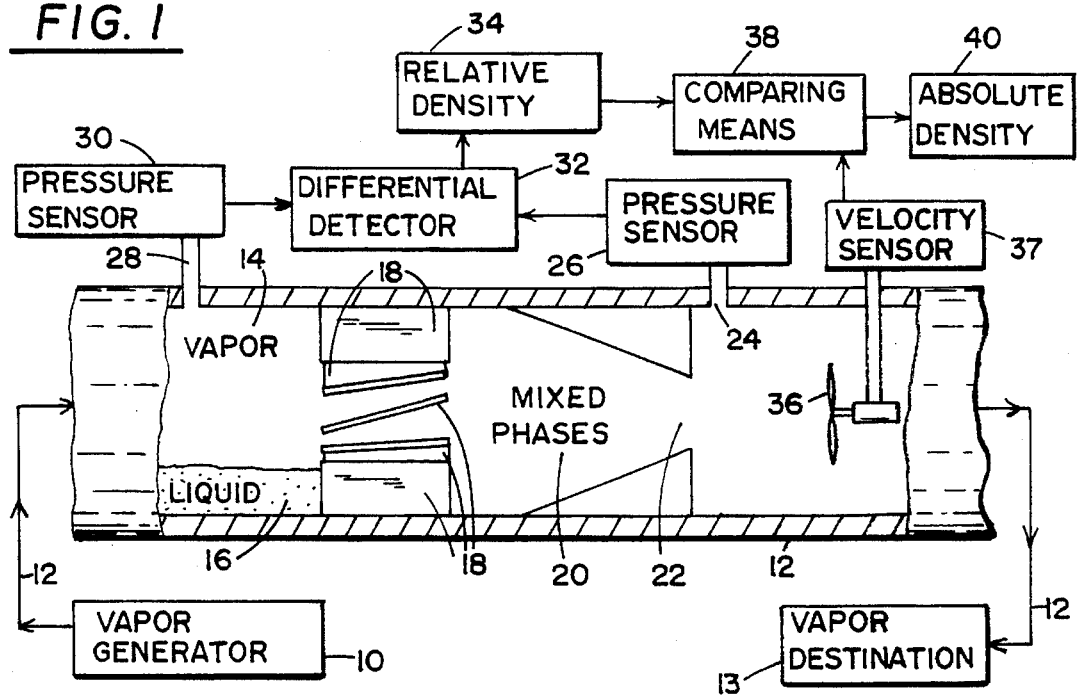
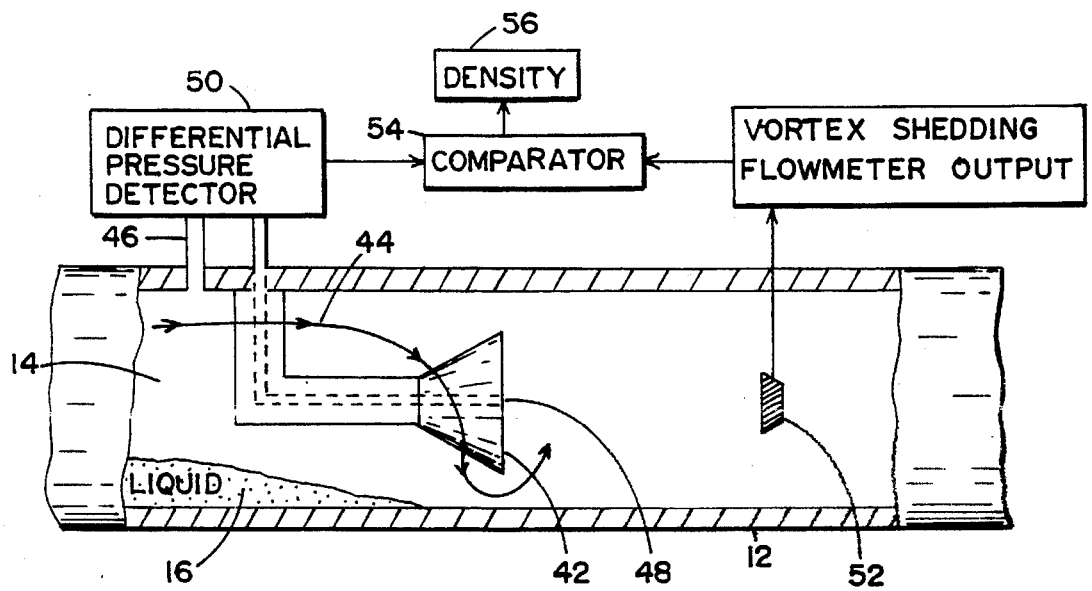

VAPOR DENSITY MEASUREMENT SYSTEM

TECHNICAL FIELD

This invention relates to the measurement of the density of fluids having a mixture of vapor and liquid, such as steam and water, as they are conveyed through distribution pipes.

BACKGROUND OF THE INVENTION

Whenever gaseous fluids are moved significant distances through pipes, they may change character as less volatile or cooler fractions condense into the liquid phase. The liquid moves slower and gathers in low spots. The slugs of liquid are then forced along in spurts of sudden, erratic, and unpredictable movement that interfere with the efficient operation of the overall system. For example, natural gas may have entrained water vapor that condenses into liquid water that impedes the flow of gas vapor through the gas line.

The most common example of this problem is experienced in steam distribution lines. Eventually, the cooler walls of the pipe condense the steam into water. If the steam is being used in a chemical process, the water may degrade the desired reactions. A typical use for large steam distribution systems is where steam is injected into oil wells to enhance recovery. A central steam injection system usually supplies many wells and the steam is often conveyed through miles of pipe to reach the well heads. The efficiency of oil recovery depends on the quality and heat content of the steam when it is injected into the well. It is, therefore, necessary to be able to measure the relative amounts of steam vapor and liquid water passing through the pipe on a real time basis. But this measurement has been difficult to achieve using prior art techniques.

The general problem solved by this invention is the measurement of the relative amounts of vapor and liquid passing through a pipe. Since steam and water is the hardest mixture to measure, and also the most economically desirable, this description emphasizes steam and water mixtures. But it should be understood that all of the principles of the invention apply equally to any mixture of vapor and liquid.

Since vapor, or the gas phase, is lighter and less dense than liquid, if the overall density of the contents of a pipe can be determined, then the ratio of liquid to gas can be inferred therefrom. The more dense the contents, the more liquid phase must be present. One prior art method to sense density is to employ a nuclear densitometer. The amount of gamma radiation passing through the pipe from a radioactive source is measured. If the average density of the pipe contents rises, the gamma radiation is blocked and declines. But this approach is very expensive and the handling of a radioactive source is difficult and subject to much government regulation. Also, the source is not stable but continuously declines, requiring frequent recalibration and questionable long term accuracy. The present invention provides a more accurate, less expensive, and safer apparatus to measure the density of a vapor and liquid mixture flowing through a pipe.

STATEMENT OF THE INVENTION

Briefly, the present invention mounts a mixing means inside the pipe, such as impeller blades on the pipe wall or a swirl cone in the center of the pipe, to break up and atomize the liquid into droplets suspended in the vapor. This produces a near homogeneous cloud or mist of vapor and liquid. In the case of steam, a mixture of steam and atomized suspended water droplets is created that behaves like a pseudo-single phase gas for about ten pipe diameters downstream where it collapses back to a liquid on the bottom of the pipe with steam above.

In this single phase mixture region, the mixture is passed through a narrower passage so that it accelerates to a greater velocity. In accordance with the well known Bernoulli principle, the higher velocity mixture has a lower pressure. By comparing the pressure before the mixing means to the pressure just after the narrow passage, the amount of change in pressure, or pressure drop, of the mixture can be determined. All other things being equal, if the pipe contains pure vapor or gas, the pressure difference is always the same and can thus be calibrated as a pure or one hundred percent gas condition.

As liquid builds up in the pipe, more drops of liquid will be atomized and suspended by the mixing means into the pseudo-single phase gaseous mixture, making it heavier and more dense. The denser mixture does not pass through the narrow passage as easily, so the pressure drop is greater for denser mixtures. Thus, the pressure difference between the area before the mixing means and the area after the narrow passage is a direct indicator of the relative amounts of steam and water. More pressure difference means more liquid water in the pipe.

Stated generally, more pressure drop indicates more mass flow across the measuring system. Pure steam has a fixed known density at a given temperature. In order to increase the mass flow across the measuring system, there must be an increase in the proportion of heavier, more massive, liquid water.

The absolute value of the pressure drop across the measuring system does assume a consistent average velocity of steam through the pipe. If the steam generator reduces its output unpredictably, the differential pressure drop across the measuring system would also reduce as the velocity of the mixture through the narrow passage declined. This would look like a density decrease when, in fact, the cause is actually reduced average velocity of steam from the generator. To avoid this source of error, the present invention also contemplates a velocity measuring means downstream of the measurement area, but still in the pseudo-single phase region, to measure the true velocity of the steam and water droplet mixture. The pressure drop can be compared to the velocity measurement to cancel out pressure changes that are the result of velocity changes due to external causes.

Other benefits and advantages will become apparent upon consideration of the following detailed description and the drawing referenced thereby.

BRIEF DESCRIPTION OF THE DRAWINGS

FIG. 1 is a schematic diagram of the vapor and liquid mixture density measuring system of this invention; and FIG. 2 shows another embodiment of the invention using a different vapor and liquid mixing means and a different velocity measuring device.

DETAILED DESCRIPTION OF THE INVENTION

In FIG. 1, a vapor generating means 10 is shown which may comprise, for example, a steam generating plant. The steam is conveyed through a pipe 12, shown partly with schematic arrows, and partly in section in the desired measurement area. The steam is delivered to a desired destination 13, which could comprise, for example, an enhanced recovery oil well head. Any vapor phase steam 14 will generally be above liquid phase water 16. Also, in general, the vapor, being lighter and less viscous, moves downstream faster than the water, which, in FIG. 1, would be to the right.

Vapor 14 and liquid 16 are intermixed and homogenized by a suitable mixing means, which, in FIG. 1, comprises a plurality of impellers or spin inducing plates 18 on the interior wall of pipe 12. This creates a simulated single phase mixture of atomized fluid droplets and vapor 20 that behaves like a gaseous fluid, or pseudo-single phase vapor, for approximately ten pipe diameters downstream of the mixing means 18. The homogeneous mixture 20 passes through a narrower passage or constriction 22 and, accordingly, is caused to speed up. This is the very well known venturi effect. The accelerated mixture has a higher velocity and a lower pressure. This lower pressure is measured with a suitable tap 24 and a sensor 26. The original pressure in pipe 12 is measured with a tap 28 and a pressure sensor 30 at a location before the mixing means 18. Sensors 26 and 30 are well known and readily available devices that generate an output proportional to the measured pressure. These two outputs are compared by a differential detector 32, whose output 34 is proportional to the pressure difference across the measuring area from tap 28 to tap 24. This output 34 is also indicative of the relative density of the mixture 20. For a given steady supply of steam from generator 10 at a constant pressure, the pressure drop across the measuring area, for pure steam, is always the same. Hence, if desired, output 34 could drive a meter and the reading for pure steam calibrated.

If pipe 12 starts to accumulate some condensed water 16, so that pure steam is no longer present, mixing means 18 will mix the water into mixture 20 increasing the mass and density of mixture 20. The heavier mixture is harder to accelerate by the pressure force from generator 10. This is a consequence of Newton's second law of motion. Thus, the denser mixture 20 does not increase velocity as much through constriction 22 and the pressure at pressure tap 24 is lowered. The difference in pressure detected by detector 32 is accordingly greater. Therefore, greater outputs 34 correspond to denser lower quality steam with more water content. In summary, more liquid means more mass, which means more pressure difference.

The output 34 is, by itself, an indication of the relative density of the vapor and liquid combination in pipe 12. But the pressure drop across the measuring system not only becomes greater with increased mass from increased liquid and increased density, but it also becomes greater with an increase in the average velocity of steam through pipe 12. This is because the change in velocity across the constriction 22 is a percentage or fraction of the overall average velocity. If the overall average velocity is cut in half, the change in velocity across passage 22 is cut in half. This means that any alteration of the output of generator 10, or destination 13, that reduces the flow of steam through the system will produce a reduced pressure drop across the measuring system that looks like a density decrease, when, in fact, it originates from a flow reduction. To avoid this source of error, the present invention also contemplates an average velocity measuring means which comprises a turbine 36 that produces an output signal 37 proportional to the average velocity of the steam. This output 37 can be referenced to determine that there is a normal flow of steam during the time that pressure output 34 is relied upon. Or, alternatively, a comparing means 38 may be connected to automatically compensate for changes in average steam velocity and generate a true output 40 that represents absolute density.

Turbine 36 is an off the shelf velocity sensor well known to those skilled in the art. It should be located far enough downstream from passage 22 to sample the reestablished average steam velocity rather that the temporarily accelerated steam through passage 22. However, velocity sensing turbine 36 should still be within ten diameters of mixing means 18 where mixture 20 persists.

FIG. 2 demonstrates another embodiment of the invention in which a cone 42 is positioned in pipe 12 to perform both the mixing function and the constriction function. When the higher speed vapor 14 encounters cone 42, it swirls down and around cone 42 as generally indicated by arrows 44. The vapor turbulence picks up and mixes in liquid 16 and simultaneously speeds up in accordance with the-venturi effect. The pressure is sensed before the mixing by a tap 46 and downstream of the mixing cone by a tap 48 located in the center of the cone 42. As before, the difference in pressure is detected by a detector 50.

A different velocity measuring means is depicted as well. A device well known to those skilled in the art, and known as a vortex shedding flowmeter, is schematically illustrated in FIG. 2. A flowmeter 52 comprises a blunt sharp edged member that extends from wall to wall in pipe 12. Vortexes are alternately shed from the top and bottom edges of flowmeter 52, causing the flowmeter to vibrate at a frequency that increases with steam velocity. A piezoelectric crystal generates an electrical signal at this frequency. Again, this device is a commercially available flowmeter and, therefore, further details of its operation are not incorporated here. A comparator 54 electronically compensates the output of detector 50 for any velocity induced change of differential pressure so as to produce a density output 56 that is related just to changes in the density of the combined vapor and liquid flowing between taps 46 and 48.

Clearly, a wide variety of mechanisms may be suitable to mix the liquid and vapor into a pseudo-single phase mixture. Likewise, the configuration of the venturi constriction can take many forms. Numerous average velocity measuring means are useable along with many types of pressure sensing devices. Hence, we intend to be limited not to the specific examples depicted in the drawing, but only by the appended claims and their equivalents.

I claim:

1. A system to measure the relative amounts of vapor and liquid flowing in a pipe comprising in combination:

means in said pipe to mix the vapor and liquid into a generally homogeneous mixture;

a venturi constriction in the pipe adapted to accelerate said mixture and thereby lower the pressure of said mixture;

first pressure sensing means connected to measure the pressure in the pipe at a location before the vapor and liquid are mixed;

second pressure sensing means connected to measure the lower pressure produced by said venturi constriction;

pressure difference sensing means connected to said first and second pressure sensing means, and adapted to produce an output proportional to the difference in pressure between said first and second means as an indication of the density of said mixture and the relative amount of liquid mixed with the vapor; and means in said pipe to measure the average velocity of said mixture at a location downstream of said constriction and where the mixture is still homogenous.

2. The system of claim 1 including a comparing means connected to said means to measure the average velocity and also connected to the output of said pressure difference sensing means, said comparing means operable to produce an output indicative of the density of the mixture which output is not affected by changes in the average velocity of the mixture.

3. The system of claim 1 in which the mixing means includes means to swirl the vapor and liquid.

4. The system of claim 3 in which the means to swirl includes a cone positioned in the pipe.

5. The system of claim 4 in which the cone forms said venturi constriction.

6. The system of claim 1 in which the means to measure average velocity includes a turbine.

7. The system of claim 1 in which the means to measure average velocity is a vortex shedding flowmeter.

8. The system of claim 1 in which said means to measure the average velocity is at a location within about ten pipe diameters downstream from said means to mix the vapor and liquid.

9. The system of claim 1 in which said means to measure the average velocity is at a location approximately ten pipe diameters downstream from said means to mix the vapor and liquid.

10. The method of measuring the quantity of liquid flowing through a conduit primarily used to carry a gas comprising the steps of:

mixing the gas and liquid into an approximately homogeneous mixture of gas and liquid droplets suspended in the gas;

flowing said mixture through a constriction so as to produce a pressure drop;

measuring the pressure drop across said constriction as an indication of the quantity of liquid in the mixture;

measuring the average velocity of the mixture in a location after the mixture flows through the constriction and where the mixture is still homogenous; and subtracting out pressure drop changes across the constriction resulting from changes in the average velocity from pressure drop changes resulting from changes in the quantity of liquid in the mixture.

11. The method according to claim 10 in which mixing the gas and liquid is effected by swirling the gas and liquid.

12. The method according to claim 11 in which the gas and liquid are passed around a cone forming said constriction.

13. The method of claim 10 in which the liquid is water and the gas is steam.

14. The method of claim 10 in which the step of measuring the average velocity is conducted at a position within about ten pipe diameters of where the step of mixing the gas and liquid is conducted.

15. The method of measuring the mass flow of gas and liquid flowing through a conduit comprising the steps of:

mixing the gas and liquid into a mixture of gas with liquid droplets suspended in the gas;

flowing said mixture through a constriction so as to produce a pressure drop;

measuring the pressure drop across said constriction as an indication of the combined mass of gas and liquid in the mixture;

measuring the velocity of the mixture in a location after the mixture flows through the constriction and where the mixture still has the liquid droplets suspended in the gas; and subtracting out pressure drop changes across the constriction resulting from changes in the average velocity from pressure drop changes resulting from changes in the mass of the mixture.

16. The method of claim 15 in which the liquid is water and the gas is steam.

17. The method of claim 15 in which the velocity measuring step is performed approximately ten pipe diameters or less from the mixing step.

\* \* \* \* \*